(No Model.)

W. CAHOON, Jr.

COMPOUND WATER COCK AND SEWER GAS CUT-OFF.

No. 298,347. Patented May 13, 1884.

Witnesses:
Taylor E. Brown
H. W. Munday

Inventor:
William Cahoon Jr.
per Munday, Evarts & Adcock
his Attorneys

United States Patent Office.

WILLIAM CAHOON, JR., OF CHICAGO, ILLINOIS, ASSIGNOR TO WALTER M. KEENAN, OF SAME PLACE.

COMPOUND WATER-COCK AND SEWER-GAS CUT-OFF.

SPECIFICATION forming part of Letters Patent No. 298,347, dated May 13, 1884.

Application filed June 29, 1883. (No model.)

*To all whom it may concern:*

Be it known that I, WILLIAM CAHOON, Jr., a citizen of the United States, residing in Chicago, in the county of Cook and State of Illinois, have invented a new and useful Improvement in Compound Water-Cocks and Sewer-Gas Cut-Offs, of which the following is a specification.

The present invention relates to certain improvements in compound water-cocks and sewer-gas cut-offs.

The object of the invention is to provide an apparatus for supplying hot and cold water into wash-basins, bath-tubs, &c., and for cutting off the inflow of all dangerous gases through the sewer-pipe connections thereof.

The invention consists in providing the waste-pipe with an ordinary ball-valve operated simultaneously with the cocks in the hot or cold water pipes, so that all connection with the sewer may be absolutely cut off when the water is not flowing, and in regulating the supply of hot or cold water or both commingled, so that when the water is flowing and the waste-pipe valve is open the influx of gases through the same may be prevented by a continuous downflow of water properly gaged in volume, so as to seal the open or partially open valve in the waste-pipe.

The invention also consists in the novel construction, combination, and arrangement of devices herein shown and described.

Figure 1:
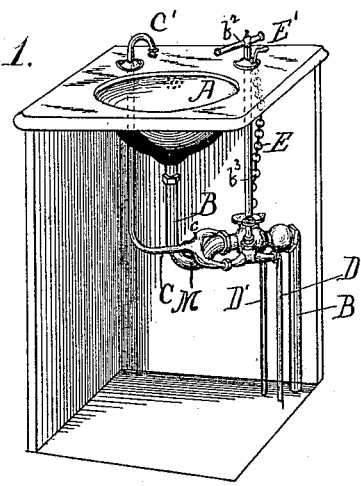
Figure 2:
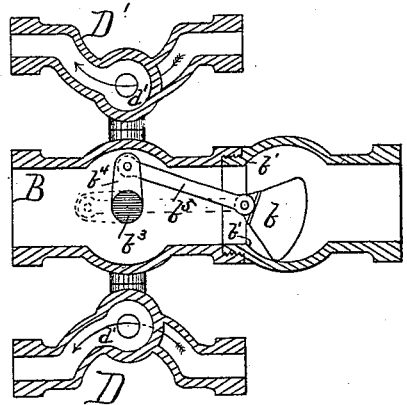

In the accompanying drawings, which form a part of this specification, and in which similar letters of reference indicate like parts, Figure 1 is a perspective view of a device embodying my invention. Fig. 2 is a central horizontal section through the waste and water pipe valves; and Fig. 3 is a transverse vertical section through the waste and water pipe valve.

In the drawings, A represents a wash-basin, B the waste-pipe connecting thereto, and C the water-pipe. D and D' are the hot and cold water pipes, respectively. The waste-pipe B is provided with an ordinary conical valve, $b$, which fits on the valve-seat $b'$, to close the waste-pipe. The valve $b$ is operated from the handle $b^2$ through the rod $b^3$, which is provided with a crank or arm, $b^4$, on its lower end, the crank or arm $b^4$ being connected with the valve $b$ by the link $b^5$. The hot-water pipe D and cold-water pipe D' are united at $c$, so that a single pipe, C, and its faucet or spout C' may serve to convey both the hot and the cold water to the bowl A, and so that the hot and cold water may be mingled together, if desired, before being discharged into the bowl. The rod $b^3$ is provided with a disk-cam, $a$, for operating the hot and cold water cocks or valves. Each of the water-pipes D and D' is provided with an ordinary plug or compression valve, $d$, which fits on the valve-seat $d'$, and is secured to a valve-stem, $d^2$. The valve-stem $d^2$ is provided with an adjustable button or nut, $d^3$, which projects over the cam $a$, so that by revolution of the cam either the hot or the cold water valve may be raised or opened. By adjusting the nuts $d^3$ up or down, against which the cam $a$ impinges, the volume of water that will flow through the valve when the same is raised may be regulated at will to the amount necessary to seal the waste-pipe, or to cause a continuous downward current in the waste-pipe when the valve therein is opened.

Figure 3:
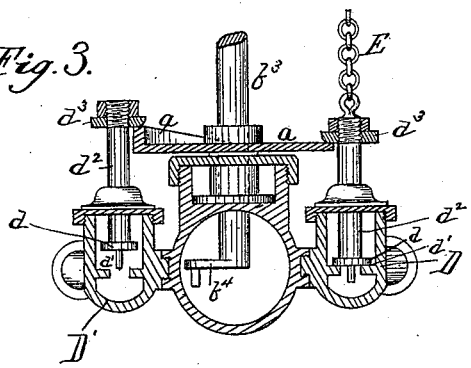

As shown in Fig. 3, the valve $d$ in the cold-water pipe is raised by the cam $a$, so that the cold water is flowing. If it is desired to allow the hot water to flow at the same time and mingle with the cold, this may be done by raising the valve $d$ of the hot-water pipe at the same time by any suitable means. E is a chain connected with the valve $d$ of the hot-water pipe for this purpose. This chain E is provided with a ring or handle, E', immediately under the handle $b^2$, so that the hot-water valve may be conveniently raised with the finger at the same time that the cold-water pipe is opened by turning the handle $b^2$. The cam $a$ is secured rigidly to the rod $b^3$, and in such relation to the crank-arm $b^4$, which operates the valve $b$, that the waste-pipe will always be closed by the valve $b$, except when the cam lifts one of the valves, $d$, so as to open either the hot or cold water pipe. It will thus be seen that all connection with the sewer is effectually shut off by the valve $b$ in the waste-pipe, except when the water is flowing into he bowl from either the hot or cold water pipes, or from both commingled. While the water is thus flowing through the waste-pipe, the flowing water creates a downward current in the waste-pipe which will effectually prevent the influx of noxious gases through the same. Whenever the valve in the waste-pipe is open, one of the water-pipes is also open, as the same operation opens both valves, so that water is always necessarily flowing through the waste-pipe when the valve therein is open.

By means of the adjustable buttons $d^3$ on the valve-stems $d^2$, the volume of flowing water may be so regulated in relation to the extent to which the valve $b$ in the waste-pipe is opened as to seal the waste-pipe either by the volume of water standing on the valve $b$, or by means of the continuous downward current created in the waste-pipe by the flowing water. When the water is flowing and the plug is in place in the bowl or bath-tub, the outlet is then of course through the overflow-opening. The bowl shown in the drawings is itself provided with an overflow-opening and passage connecting with the waste-pipe above the valve $b$ therein, so that the overflow water may seal the waste-pipe the same as if the plug were out. As an additional precaution, an ordinary S or other trap, M, may be inserted, if preferred, in the waste-pipe above the valve $b$. When so used in combination with the valve $b$ below the trap, the valve $b$ will prevent all possibility of the water siphoning out of the trap, and thus furnish an absolute protection against sewer-gas.

I claim—

1. The combination, with the waste-pipe and the hot and cold water pipes having suitable drop valves or cocks for opening and closing the same, of a conical valve for opening and closing the waste-pipe, and a rod having a crank for operating said waste-pipe valve, and a cam for operating said cocks in the water-pipes, so that said waste-pipe may be closed, except when said water-pipe valves are opened, substantially as specified.

2. The combination, with the waste-pipe B, of the conical valve $b$, its valve-seat $b'$, handle $b^2$, rod $b^3$, crank-arm $b^4$, link $b^5$, cam $a$, secured to said rod $b^3$, water-pipe D, valve $d$, valve-seat $d'$, valve-stem $d^2$, and button $d^3$, whereby said valve is operated by the cam $a$, substantially as specified.

3. The combination, with the waste-pipe B, of the conical valve $b$, its valve-seat $b'$, handle $b^2$, rod $b^3$, crank-arm $b^4$, link $b^5$, cam $a$, secured to said rod $b^3$, hot-water pipe D, and cold-water-pipe D', each provided with valve $d$, valve-seat $d'$, valve-stem $d^2$, and adjustable button $d^3$, whereby said valves $d$ are operated by the cam $a$, substantially as specified.

4. The combination, with waste-pipe B, hot and cold water pipes D and D', united together at $c$, water-pipe C, conical valve $b$, for closing the waste-pipe, and drop-valve $d$, for closing the hot and cold water pipes, mechanism for simultaneously operating the valve of said waste-pipe, and either said hot or cold water pipe, and a device for independently lifting the valve of either the hot or cold water pipes, so that both the hot and cold water may be allowed to flow at the same time and mingle together in the pipe C, substantially as specified.

5. The combination of the rod $b^3$, for operating the valve of the waste-pipe, with cam $a$, secured thereto, for simultaneously operating the valve of the water-pipe, substantially as specified.

WILLIAM CAHOON, JR.

Witnesses:
H. M. MUNDAY,
J. L. WILSON.